Figure 3:
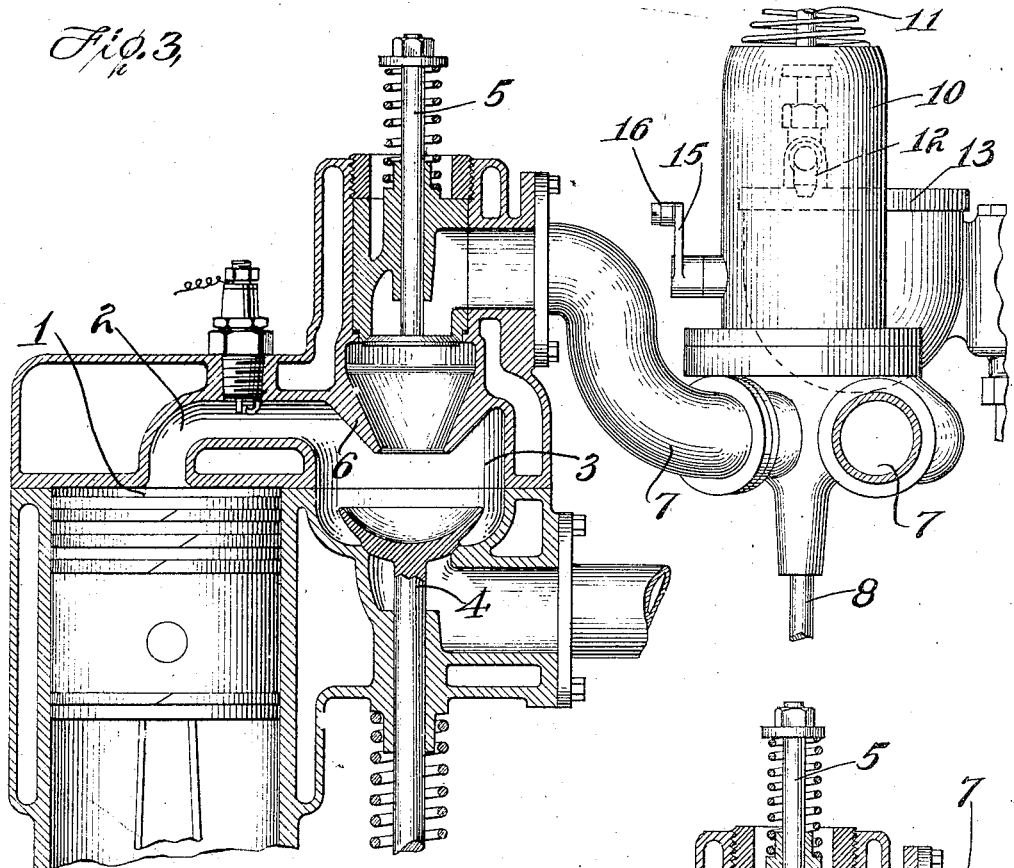

Dec. 11, 1928.
J. GOOD
1,695,186
COMBUSTION ENGINE
Original Filed Feb. 28, 1918   2 Sheets-Sheet 1
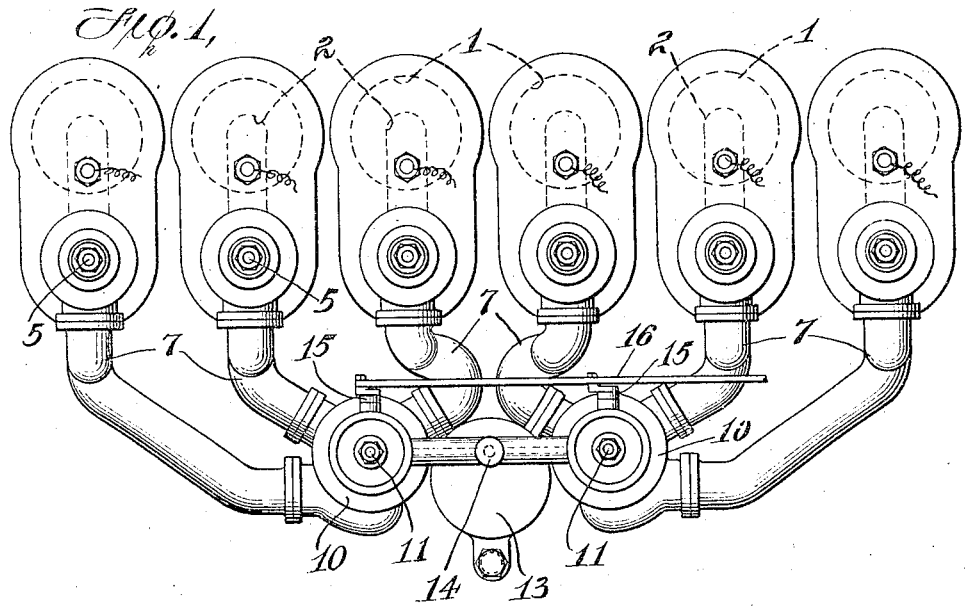
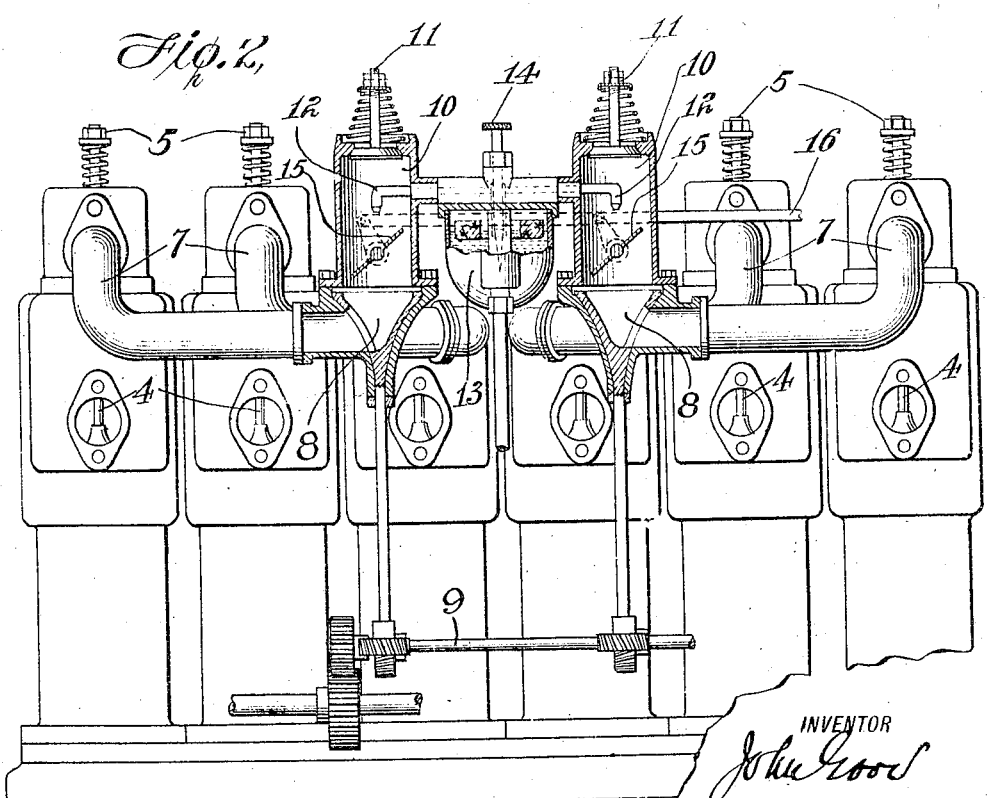
INVENTOR
John Good
BY
ATTORNEY Dec. 11, 1928.

J. GOOD 1,695,186

COMBUSTION ENGINE

Original Filed Feb. 28, 1918   2 Sheets-Sheet 2

INVENTOR
John Good
BY
Wetmore Jenner
ATTORNEY

Patented Dec. 11, 1928.

1,695,186

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

COMBUSTION ENGINE.

Application filed February 28, 1918, Serial No. 219,579. Renewed October 2, 1926.

The invention concerns the manner of admission, vaporization, and combustion of a mixture of liquid fuel and air in internal combustion engines more particularly multi-cylinder engines burning the less volatile grades of fuel and as illustrated consists in an organization of the combustion space and intake and exhaust passages of the engine according to certain principles hereinafter explained whereby the combustion proceeds with high thermal efficiency, even with these lower grades of fuel and with a minimum of contamination of the lubricating oil by the fuel liquid, as well as with various other advantages which will be made apparent to those skilled in this art.

Figure 4:
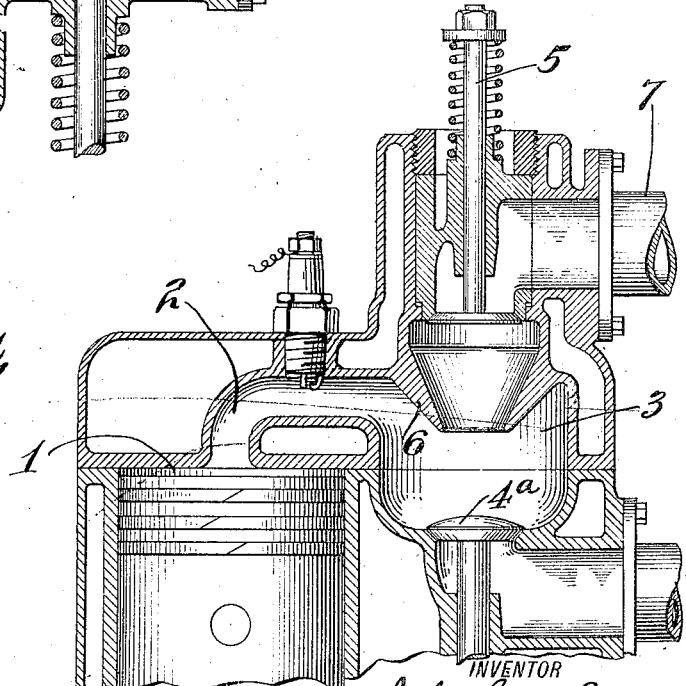

In the drawings:

Fig. 1 is a top plan of a six-cylinder engine having the invention applied;
Fig. 2 a side elevation thereof with the distributing means in section;

Fig. 3 a transverse vertical section in larger scale on the plane of the exhaust and intake valves of one of the cylinders showing also the intake and fuel distributer mechanism; and Fig. 4 is a modification.

Each of the engine cylinders, being water-jacketed or otherwise equivalently cooled, is designed so that the piston is very close to the cylinder head at its inner or upper dead center, leaving only a narrow space 1 by which the cylinder space exceeds the stroke volume. This space is in open communication through a relatively narrow, transverse, externally cooled passage 2 with the valve chamber 3 and opens downwardly into the latter. The floor or bottom of the valve chamber thus depressed is also water-jacketed but is principally constituted by the exhaust valve 4 which may be of various types as presently explained. The inlet valve 5 opens into the upper part of the valve chamber preferably directly above the exhaust valve and is so related thereto that the inflowing mixture of air and fuel is directed toward the face of said valve or at least downwardly toward the lower part of the said chamber 3. The directing means shown in Fig. 3 comprises an annular boss 6 or a frusto-conical flange 6 associated with or surrounding the valve seat and which forms a sort of a nozzle for the deliver of the mixture into the chamber. The wall of the said flange is divergent in form and also tapered in section so that the heat absorbed by its lowest or innermost edge will find a metallic path of ample and increasing cross-section for escape to and dissipation in the water jacket or the external cooling means.
which may be employed. Thus, the directing flange 6 is kept from becoming an ignition surface which it is desired to avoid. It will presently be plain that the form of the directing means is not essential to the invention and that there is no necessary limitation as to the kind of wall surface which will best perform the directing function. Both valves will be understood to be mechanically operated if desired, the inlet being opened during a part or all of the suction stroke and the exhaust opened during the exhaust stroke more or less and with any suitable degree of overlap, the engine shown being assumed to be a four stroke engine. In the multi-cylinder engine, each intake valve is connected to a charge making device or a proportioning device or it might be called a carburetor, by a separate intake 7 which several intakes are so organized that only one is in communication with said charge forming device at a time, the object being to assure that the proportions of fuel and air shall flow in exactly the predetermined amount to each particular cylinder whether the liquid fuel be in the state of vapor or of suspended fuel particles or in the form of a liquid stream thus avoiding any inequality in the performance of the individual cylinders of a multi-cylinder engine. There are various ways for thus insuring equal distribution of the fuel liquid with the air into individual intake parts and I may use either that shown in my co-pending application Serial No. 222,828 filed on or about March 16, 1918 or that in my prior application Serial No. 856,906 filed on or about August 15, 1914. The means of the latter application is used in the present drawing and comprises a rotary distributing valve 8 driven in proper phase with the engine by a lay-shaft 9 and adapted to connect the several intakes successively with the entrance or mixing chamber of the fuel and air. Because the engine shown comprises six cylinders in which the suction periods of different cylinders necessarily overlaps, two such distributing valves are used in the present case, each one serving those three cylinders whose suction periods do not overlap. The distributing valve in each case is a hollow conical or taper curved valve mounted in a casing the upper part of which forms a measuring or mixing chamber 10 for air and fuel liquid, air entering by the spring-loaded air check valve 11, equivalent to the air check of ordinary carburetors, and fuel entering by the nozzle 12 from a float-controlled or constant-level fuel receptacle 13 also common in carburetors. A single receptacle serves both fuel nozzles which should be identical in size and a single needle valve 14 regulates the delivery from each nozzle. The two distributing valves will be understood to be so timed as to open communication between the mixing chamber 10 and their respective intakes 7 in properly timed sequence to accommodate the suction strokes of the several cylinders as determined by the crank shaft arrangement and thereby cause fuel and air to be drawn into the cylinders in the constant proportion represented by the relative settings of the springs of the valves 11 and of the needle valve 14 and under the control of the throttle 15 of which there are two both of them joined by a link 16 for equal operation. The equality of distribution to each cylinder is independent of the character of atomization or the extent of preliminary vaporization, or the thoroughness of the mixture produced. The entire charge passes the inlet valve and such portion of the liquid as is vaporized or represented by very fine suspended particles of liquid is drawn more or less directly from the lip of the nozzle or flange 6, laterally and directly into the passage 2 and into the cylinder. The heavier particles and solid liquid by reason of their greater mass and momentum continue in the direction given to them by the nozzle or flange and strike upon or near the exhaust valve 4 which is hot from contact with the combustion products of the last charge and serves to vaporize such liquid at the same time itself losing heat which is desirable; the relatively large size of the chamber 3 provides for such a reduction in the velocity of the incoming charge as permits these heavier particles and any solid liquid there may be to leave the air and vapor stream at this point and deposit on the exhaust valve and the walls of the chamber. The deposited liquid is not swept along the walls into the cylinder by the gaseous part of the charge, because the floor of the chamber is depressed as before pointed out, and any liquid that may be left unburned on these walls drains or is blown out through the exhaust port immediately, i. e., none of it is retained in pockets and the like, and the exhaust port is at the lowest point of the chamber. It will be understood that while the engine is warming up from a cold start a considerable excess of liquid fuel is ordinarily present, generally because the e.._.he walls are not warm enough to vaporize it. According to this invention this liquid, or liquid occurring from other causes is kept from reaching the crank case. In Fig. 3 the exhaust valve is formed as a cup on its upper surface to collect and hold such liquid as may be directed upon it from the intake valve but the standard type of exhaust valve as shown at 4$^a$ in Fig. 4 performs the same vaporizing function. On the compression stroke of the piston, next following a suction stroke, the mixture of air and vapor which has been drawn directly into the cylinder from the nozzle 6 is partly returned to the chamber 3 and flows into and mixes intimately with the fuel vapor evolved by the exhaust valve, with the result that an explosive mixture is thereby produced of high volumetric efficiency because introduced into the combustion space in a relatively cool state and without tendency to pre-ignition in the combustion space. The exhaust valve which is normally the hottest surface in the combustion space, is constantly cooled by contact with the incoming charge to which it gives up heat as above explained during the whole of the suction stroke and the exposed face of the piston, the only other surface which is not externally cooled by the water jacket, is alternately in contact with a cool incoming charge, and therefore tends to be maintained at a low temperature, besides which, the incoming charge mixture may never be in explosive proportions where it is in contact with the piston. The necessity for using water injection as a means for preventing pre-ignition is thus avoided even with kerosene or very heavy fuels. Moreover the functioning of the combustion space due to its configuration is such as to reduce to a negligible minimum the contamination of the lubricating oil in the crank case by the escape of fuel liquid past the piston ring. Little or no fuel in liquid form enters the cylinder proper unless it be in the form of very fine particles not likely to wet the cylinder walls much less to flow past the piston. Added to which the floor or bottom of the valve chamber 3 is considerably lower than the transverse passage 2 which connects to the cylinder so that even though the valve chamber were more or less flooded with solid liquid fuel little or none of it would pass into the cylinders while in liquid state, as before stated. A spark plug is shown as disposed in the connecting passage 2 but it will be understood by those skilled in this art that a spark plug or other efficient means may be mounted in the combustion space in any position thought by the designer to be most efficient and depending somewhat upon the engine design. It will be understood from the foregoing description that the invention is susceptible of various forms of embodiment and that it broadly applies to single cylinder engines although specifically shown in conjunction with a six cylinder engine in connection with which the invention also pertains to the duplex organization of mixing chambers as above described.

I claim:

1. The combination of an engine cylinder, a chamber connected thereto, the outlet from the chamber leading to the engine cylinder being above the bottom of the chamber, means for delivering a charge mixture of liquid fuel and air to said chamber, an inlet valve controlling the delivery of the mixture to the chamber and an exhaust valve in the bottom of the chamber, the said inlet valve and the body of the exhaust valve being so related that the said mixture is directed toward the face of the body of the exhaust valve and liquid fuel is deposited thereon.

2. The combination with an internal combustion engine cylinder having an intake and means delivering a mixture of liquid fuel and air therethrough, of a combustion space having intake and exhaust valves and a directing flange associated with said intake valve adapted to direct the liquid particles of the mixture against the exhaust valve to be vaporized thereby, said directing flange being so arranged with the engine walls as to be cooled thereby to prevent ignition of the charge by the flange.

3. The combination with an engine cylinder, of a combustion space formed by the cylinder, a passage leading transversely therefrom and an enlarged valve chamber opening into said passage, an exhaust valve in the lower part of said chamber and below the level of the transverse passage, an intake means, including an inlet valve opening into the upper part of the chamber, and means delivering a mixture of liquid fuel and air therethrough to the chamber, said intake means directing the liquid fuel onto the body of the exhaust valve.

4. In an engine having a charge proportioning device, means for cooling the engine cylinder, and intake and exhaust valves, the combination of a tapered flange associated with the intake valve, and adapted to direct the incoming fuel mixture from said device toward the said exhaust valve, the wall of said flange being also tapered in section and the thicker end of the wall being related to said cooling means so that the heat absorbed by the flange will be rapidly dissipated to prevent ignition of the charge by the flange.

5. In an engine of the kind described, an exhaust valve having its body formed as an imperforate cup arranged to receive the non-vaporized liquid fuel admitted to the engine and retain the same until the liquid is vaporized, whereby the cup receiving the liquid fuel is cooled along with the cooling of the exhaust valve.

6. In an internal combustion engine, means providing a mixture of liquid fuel and air, an exhaust valve having an imperforate lip on the upper surface of its body constituting a cup, an intake means directing said mixture of liquid fuel and air toward said cup whereby the fuel in liquid form is deposited therein, and means for cooling said valve body and thereby preventing ignition of the mixture by the fuel receiving cup.

In testimony whereof, I have signed this specification.

JOHN GOOD.